Jan. 27, 1942.   J. E. HALE ET AL   2,271,337
PNEUMATIC TIRE
Filed Feb. 2, 1937   3 Sheets-Sheet 1

INVENTOR
James E. Hale
AND
Albert Hargraves

Albert L. Ely
ATTORNEY

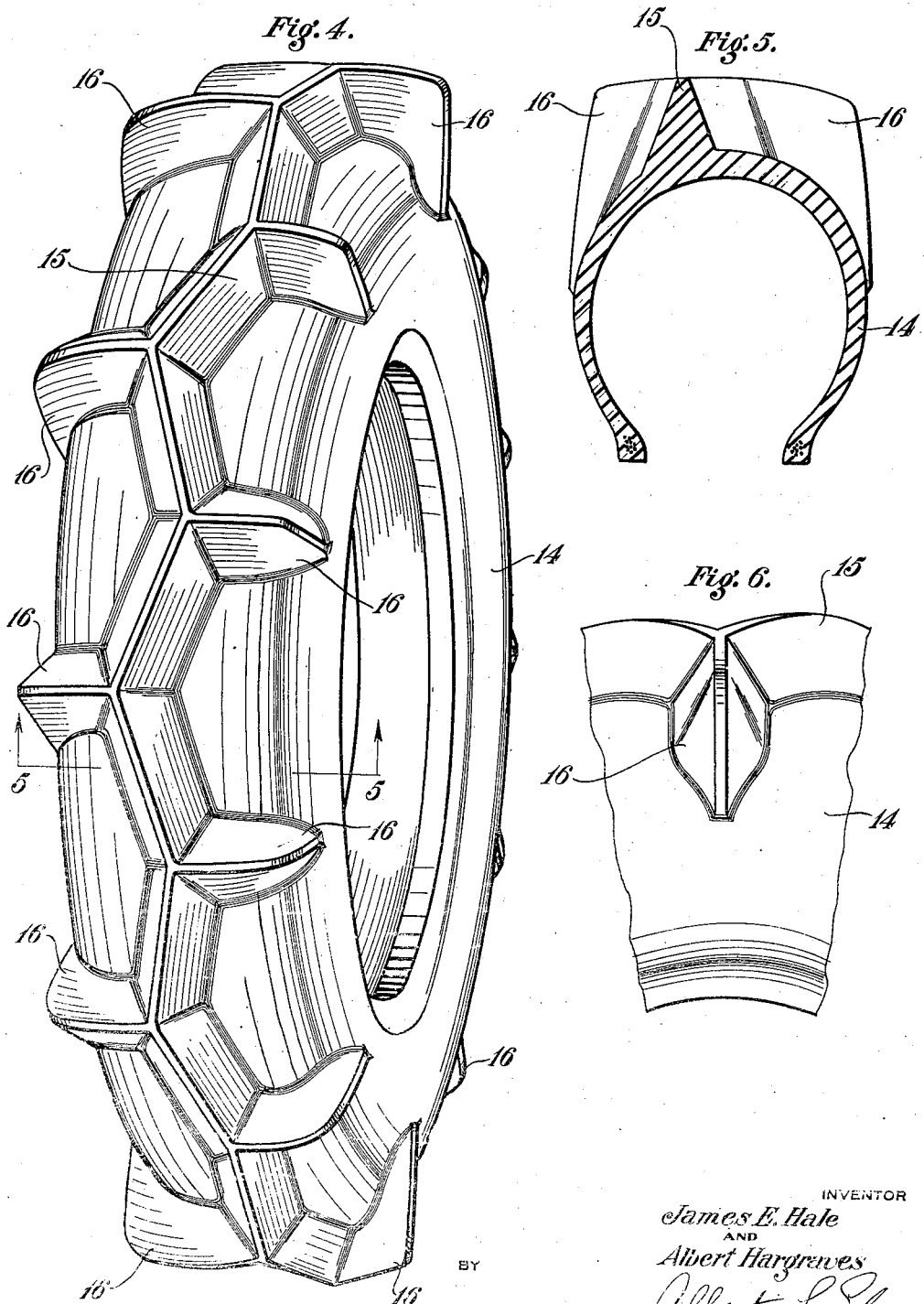

Jan. 27, 1942.  J. E. HALE ET AL  2,271,337
PNEUMATIC TIRE
Filed Feb. 2, 1937  3 Sheets-Sheet 3
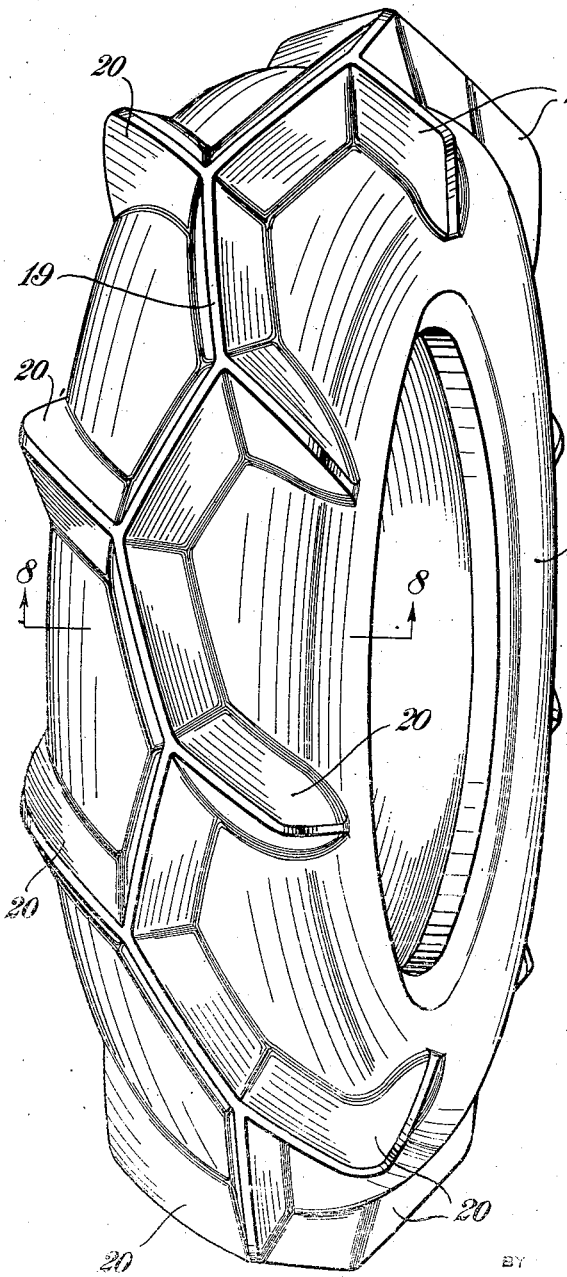
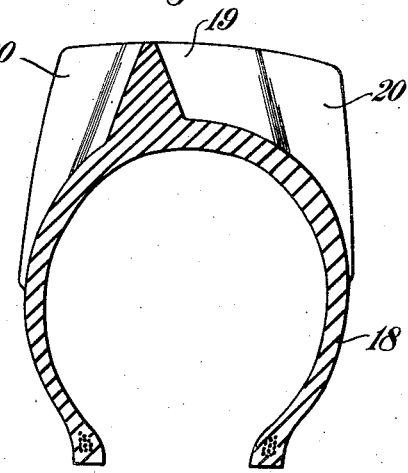
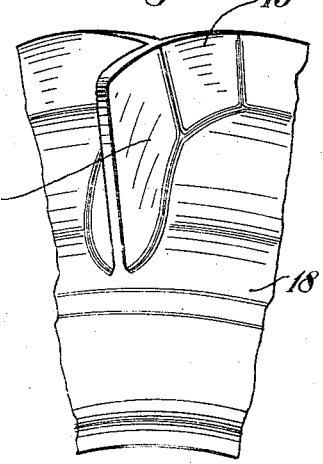
INVENTOR
James E. Hale
AND
Albert Hargraves
ATTORNEY Patented Jan. 27, 1942

2,271,337

UNITED STATES PATENT OFFICE 2,271,337

PNEUMATIC TIRE

James E. Hale, Akron, and Albert Hargraves, Silver Lake, Ohio, assignor to The Firestone Tire & Rubber Company, Akron, Ohio, a corporation of Ohio Application February 2, 1937, Serial No. 123,626

3 Claims. (Cl. 152—209)

This invention relates to pneumatic tires for vehicle wheels, and more especially it relates to improved pneumatic tires for tractors used for agricultural purposes under special conditions wherein the pneumatic tires and steel tires heretofore used have been found not satisfactory.

The improved tire embodying the present invention is designed primarily for use in agricultural operations that are carried out in extremely wet or muddy ground, and even in partly submerged soils. Such conditions obtain normally in rice and sugar cane farming, and present a serious obstacle to the expeditious plowing of the land and the moving of the harvested crop therefrom. In the cane fields conditions are further aggravated by the presence of much vegetable litter, such as cane leaves and shucks, upon the ground.

Various expedients have been tried for meeting the foregoing conditions, among which may be mentioned steel wheels provided with deep spade lugs. Tractors equipped with these tires will pull through mud under some conditions, but frequently cane shuck litter on the ground mats with the muddy soil in such a way as to form great balls of mud between the cleats or lugs on the wheel, sometimes to such an extent that the tractor can no longer pull its load. Furthermore, steel-cleated wheels frequently cut through the hard pan immediately below the muddy soil, and bog down, thus causing serious loss of water at that point during the flooding season while rice is growing, and ruining that portion of the field for a year or more. Also, tractors equipped with steel wheels and spade lugs are not permitted to travel over highways and bridges with the result that their activities are confined strictly to the fields.

Another expedient that has been attempted is to equip the tractors with ordinary agricultural pneumatic tires, and mount thereon non-skid chains equipped with deep lugs. Although such equipment provides adequate traction in deep mud, it is open to the same objections as steel wheels with cleats, namely, it cannot be used on the highways, and provides very bumpy riding. Moreover, the chains are too heavy and unwieldy to conveniently put on and take off, they cut down the power of the tractor, and frequently cause damage to the tires to which they are applied.

At the present time the cane field farmers of Louisiana have found that the only satisfactory method of hauling cane at harvesting time is by the use of mules. However, the initial cost of the mules is high, and their use is confined to a few weeks of the year. During the remainder of the year they consume fodder without performing useful service.

The chief objects of the invention are to provide improved tire equipment for hauling in deep mud or gumbo, which equipment is suitable for year round operation; to provide tractor equipment of the character mentioned that will not inflict damage upon the soil; that will not damage highways and consequently will be permitted to travel thereover; that will be self-cleaning, and for that reason always will be able to provide traction in deep mud, muck, or gumbo; that will make for easy riding; that may be used on tractors for plowing, cultivating, and other farm operations, as well as for hauling; and that is subject to flotation whereby sinking into soft soil at least is retarded. Other objects will be manifest.

Of the accompanying drawings:

Figure 4 is a perspective view of another embodiment of the invention;

Figure 5 is a section on the line 5—5 of Figure 4;

Figure 6 is a fragmentary side elevation of the tire shown in Figure 4;

Figure 7 is a perspective view of still another embodiment of the invention;

Figure 8 is a section on the line 8—8 of Figure 7; and

Figure 9 is a fragmentary side elevation of the tire shown in Figure 7.

Figure 1:
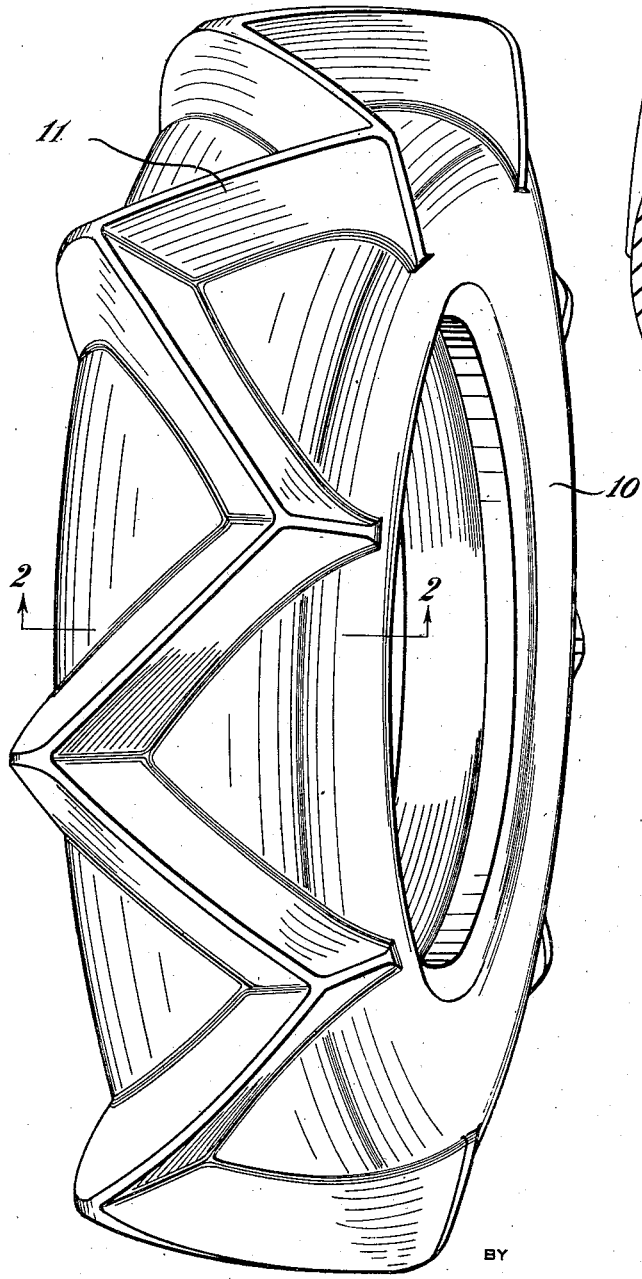
Figure 1 is a perspective view of a pneumatic tire casing constituting one embodiment of the invention.
Figure 2:
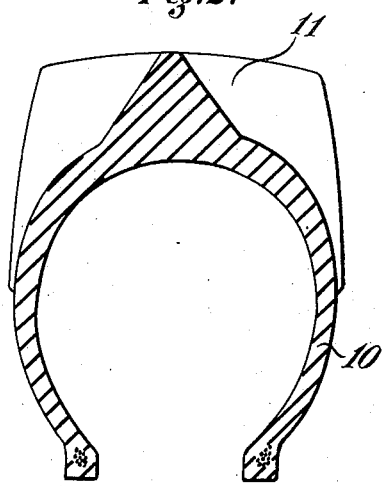
Figure 2 is a section on the line 2—2 thereof.
Figure 3:
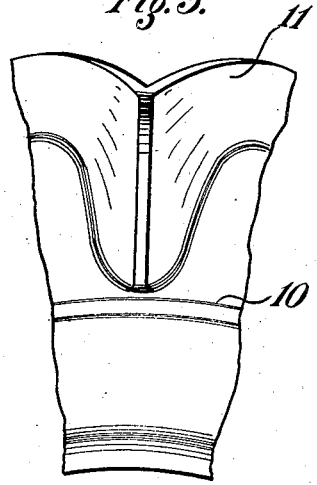
Figure 3 is a fragmentary side elevation of the tire shown in Figure 1.

Referring to Figures 1 to 3 of the drawings, there is shown a pneumatic tire casing 10 of relatively large size and having relatively thin side walls, the tire being designed to operate at low inflation pressure in the manner of so-called "balloon tires." The tread portion of the tire is formed with a relatively tall, upstanding traction element in the form of a zig-zag rib 11 that is continuous circumferentially of the tire, the angles of the rib being disposed at the opposite lateral margins of the tread of the tire and the straight reaches of the rib extending obliquely across the tread. The rib 11 is of such height that its radial dimension constitutes approximately 20% of the total radial height of a transverse section of the tire. In most tires of this type the height or radial dimension of the rib will be about 2½ inches. As is clearly shown from the drawings, the height of the rib 11 is at least as great as the average width thereof. In transverse section the rib 11 is tapered from a relatively wide base to a relatively narrow flat top or crest, the arrangement providing a draft that facilitates the withdrawing of the rib from the mud in which it normally operates. The tread of the tire is symmetrical, and it operates equally well when driven in either direction.

The rib 11 is rugged and aggressive, and because of its angular, zig-zag shape, each straight reach thereof laterally reinforces or buttresses the adjacent straight reaches united to its respective ends, with the result that the rib is enabled to withstand the severe strains of service conditions. Since the tire operates at low inflation pressure, there will be substantial flexure in the region thereof that is in contact with the ground, and such flexure provides sufficient relative movement between adjacent straight reaches of the rib 11 as to loosen any mud or soil that may become caked in the angular spaces defined by said straight reaches. The fact that the said angular spaces are open to the sides of the tread at their widest point simplifies the problem of ejecting mud from the tire. The rib 11 itself has at least a modicum of resilience, and slight flexing of the rib in combination with the shape of the laterally open areas defined by the rib, and the tapered cross section of the latter, practically assures that the tire will be self-cleaning. Because of their relatively large cross section, light body construction, and low inflation, the tires possess a buoyancy that prevents them from sinking deeply into mud, notwithstanding the weight of the vehicle, with the result that less power is required for propelling the latter. The feature of the continuous circumferential rib 11 in combination with the inherent resilience of the tire makes for comfortable riding both in the fields and on pavements, and the tires achieve the other advantages set out in the foregoing statement of objects.

Other embodiments of the invention, shown in Figures 4 to 9 inclusive, differ from that previously described primarily in the arrangement of the traction element upon the tread portion of the tire, other characteristics of the invention, such as relatively light weight, large cross section, relative tall traction element, and tapered section of the latter being present in all embodiments of the invention.

Referring now to Figures 4 to 6 inclusive, there is shown a tire casing 14 having a tread portion formed with a central circumferential lug or rib 15 that is arranged in zig-zag form, inwardly from the lateral margins of the tread. From each arris or exterior angle of the rib 15, a lug 16 adjoined thereto extends to the adjacent lateral margin of the tread, the lugs 16 on opposite sides of the central rib 15 being disposed in staggered relation to each other. The lugs 16 are parallel to each other and to the axis of the tire, and the tire operates equally as well when driven in one direction as when driven in the opposite direction.

The embodiment of the invention shown in Figures 7 to 9 comprises a tire casing 18, the tread portion of which is formed with a central circumferential rib 19 arranged in zig-zag fashion similar to rib 15 of the previously described embodiment. From each arris or exterior angle of the rib 19, a lug 20 adjoined thereto extends to the adjacent lateral margin of the tread, the lugs 20 on opposite sides of the central rib 18 being disposed in staggered relation to each other. The lugs 20 also are disposed obliquely with relation to the central plane of the tire, and the lugs on opposite sides of the central rib extend in the same direction so that adjacent lugs are substantially parallel to each other. The arrangement is such that the tire operates equally as well when driven in one direction as when driven in the opposite direction, but one side of the tire will not clean itself quite as readily as does the other side. In all other respects the tire achieves the several advantages inherent in the invention.

Other modifications may be resorted to without departing from the spirit of the invention or the scope of the appended claims.

What is claimed is:

1. A pneumatic tire for use on motor vehicles operating in soft, muddy soils, said tire comprising a flexible casing having a tread portion formed with a centrally disposed, circumferential, zig-zag traction and skid-resisting rib, said zig-zag rib being composed of straight components intersecting at apices on alternately opposite sides of the central plane of the tire, and a series of lateral traction ribs on each side of the tire tread, said lateral ribs joining said zig-zag ribs at said alternate apices, each of said lateral ribs extending at right angles to the central plane of the tire and at an angle to each of the adjacent straight components of said zig-zag rib.

2. A pneumatic tire for use on motor vehicles operating in soft muddy soils, said tire comprising a flexible casing having a tread portion formed integrally with a somewhat flexible traction element consisting of a continuous, circumferentially extending zig-zag rib, the arris or external angles of the rib being disposed at opposite lateral margins of the tread of the tire, and laterally outwardly extending ribs integrally formed with the zig-zag rib at the external angles thereof, each of said laterally extending ribs extending at right angles to the central plane of the tire, said traction element having a height that is approximately one-fifth the total radial height of the cross section of the tire, the lateral faces of the traction element sloping toward each other outwardly from the base of the element.

3. A pneumatic tire for use on motor vehicles operating in soft, muddy soils, said tire comprising a flexible casing having a tread portion formed with two series of lugs disposed transversely of the tire tread and extending from a region at one side of the center line of the tread to the respective lateral margins thereof, the lugs on one side of the tread being in staggered relation to those on the other side of the tread, and all of said lugs being disposed normal to the center line of the tire tread, and a centrally disposed circumferential zig-zag rib on the tread adjoined to the inner ends of said lugs, said lugs and rib having a transverse section that tapers from a relatively wide base to a relatively narrow flat top.

JAMES E. HALE.
ALBERT HARGRAVES.